United States Patent [19]

Hasegawa et al.

[11] Patent Number: 4,623,582

[45] Date of Patent: Nov. 18, 1986

[54] SHEET OF GLASS

[75] Inventors: Jun Hasegawa; Makoto Ueda, both of Tokyo, Japan

[73] Assignee: Nippon Sheet Glass Co., Ltd., Osaka, Japan

[21] Appl. No.: 852,787

[22] Filed: Apr. 16, 1986

[51] Int. Cl.⁴ .................. B32B 7/00; B32B 15/00
[52] U.S. Cl. .................................... 428/220; 428/209; 428/210; 428/336; 428/426; 428/434
[58] Field of Search ............... 428/426, 427, 428, 434, 428/209, 210, 220, 336

[56] References Cited

U.S. PATENT DOCUMENTS

| | | | |
|---|---|---|---|
| 3,903,344 | 9/1975 | Laiming | 428/426 |
| 4,039,721 | 8/1977 | Weitze et al. | 428/426 |
| 4,098,949 | 7/1978 | Kosiorek | 428/426 |
| 4,459,166 | 7/1984 | Dietz et al. | 428/209 |
| 4,536,435 | 8/1985 | Utsumi et al. | 428/209 |

Primary Examiner—William J. Van Balen
Attorney, Agent, or Firm—Bogucki, Scherlacher, Mok & Roth

[57] ABSTRACT

A sheet of glass includes a baked ceramic paste disposed on a surface thereof and a baked silver paste disposed on the surface over the ceramic paste, the baked silver paste containing silver at a proportion of at least 60 wt %.

3 Claims, 4 Drawing Figures

SHEET OF GLASS

BACKGROUND OF THE INVENTION

The present invention relates to a sheet of glass for use as a window glass sheet on an automobile or the like.

Window glass sheets on automobiles are bonded along their peripheral edges to window frames with strips of urethanes interposed therebetween. As shown in FIG. 3 of the accompanying drawings, one recently proposed window glass sheet 1 has a peripheral edge printed with a blackish ceramic collar 2 for preventing the bonded peripheral edge from being deteriorated by ultraviolet radiation and also for concealing an unsightly deposit of dirt and dust.

Where the glass sheet 1 is used as a rear window glass sheet, it is known that the glass sheet 1 is printed with electrically conductive wires 3 for defrosting the glass sheet 1, and also with bus bars 4 on opposite sides for supplying an electric current to the conductive wires 3. These conductive wires 3 and bus bars 4 are formed by baking a silver paste. The ceramic collar 2 is formed by baking a ceramic paste. The bus bars 4 are positioned in the ceramic collar 2. To form the bus bars 4 and the ceramic collar 2, a ceramic paste is printed on the inner surface of the glass sheet, and a silver paste is then printed on the printed ceramic paste. Thereafter, the glass sheet is heated and bent, whereupon the ceramic paste and the silver paste are baked by the heat of the glass sheet.

The ceramic paste and the silver paste are baked at a temperature in the range of from 600° to 700° C. at which the glass sheet is shaped. At this time, lead glass of a low melting point (frit) in the ceramic paste is dispersed in the silver paste, lowering the proportion of silver in the baked bus bars 4. If the proportion of silver in the baked bus bars 4 is reduced, then the bonding strength with which terminals are soldered to the bus bars 4 decreases.

To avoid the above shortcoming, it has been customary to have portions of the bus bars 4 project from the ceramic collar 2 and to bond terminals 5 to the projecting portions of the bus bars 4, as shown in FIG. 3. Alternatively, as illustrated in FIG. 4, each of the ceramic collars 2 has a recess 6 in which a terminal 5 bonded to the bus bar 4 is positioned.

The arrangement shown in FIG. 3 is disadvantageous in that the design of the printed pattern is not desirable since the terminals are exposed to external view, and that the conductive wires required must be long because the terminals are positioned inwardly of the bus bars 4. Problems with the structure shown in FIG. 4 are that the printing process is complex and costly because of the recess 6 defined in the ceramic collar 2. One proposal to increase the bonding strength of the terminals 5 would be to deposit a plated layer on the bus bars 4. However, no sufficient bonding strength would be achieved by such a plated layer on the bus bars 4. The above drawbacks hold true for the bonded connection between an antenna wire and its terminal on a front window glass sheet, or a windshield.

SUMMARY OF THE INVENTION

According to the present invention, the aforesaid difficulties are eliminated on the basis of findings that where a printed silver paste is of an increased thickness, the proportion of silver which remains after baking is increased, and that the baking temperature is in a certain relationship to the amount of low-melting-point lead glass which is dispersed from a ceramic paste into a silver paste. Specifically, the proportion of silver that remains in the silver paste after it is baked is selected to be 60 wt % or more.

It is an object of the present invention to provide a sheet of glass with a baked layer of silver paste which contains silver at a proportion of 60 wt % or more for an increased bonding strength.

A sheet of glass according to the present invention includes a ceramic paste and a silver paste that are successively coated on a surface thereof and then baked thereon. The proportion of silver in the baked silver paste is selected to be at least 60 wt %.

The above and further objects, details and advantages of the present invention will become apparent from the following detailed description of a preferred embodiment thereof, when taken in conjunction with the accompanying drawings.

DETAILED DESCRIPTION OF THE PREFERRED EMBODIMENT

An embodiment of the present invention will be described with reference to FIGS. 1 and 2. According to the illustrated embodiment, a sheet of glass is shaped to a bent configuration for use as an automotive window glass sheet, for example.

Figure 1:
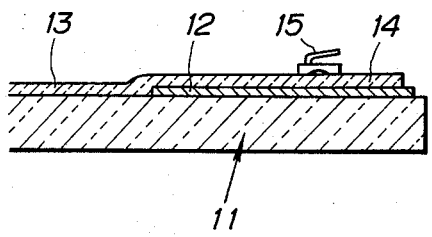
FIG. 1 is a cross-sectional view of an end portion of a glass sheet according to the present invention.

As shown in FIG. 1, a bent glass sheet 11 has an inner surface supporting on an end portion thereof a ceramic collar 2 deposited by baking a ceramic paste and a bus bar 4 deposited on the ceramic collar 2 by baking a silver paste. Electrically conductive heating wires 13, which are deposited on the inner surface of the glass sheet 11 by baking a silver paste, extend from the bus bar 14 in integral relation thereto and spaced from each other in the transverse direction (normal to the sheet of FIG. 1) of the glass sheet 11. A terminal 15 for supplying an electric current to the conductive wires 13 is soldered to the bus bar 14.

The ceramic paste from which the ceramic collar 12 is formed comprises a mixture of 55 to 80 wt % of lead glass having a low melting point, 10 to 35 wt % of an inorganic pigment, and 10 to 25 wt % of oil, for example. Dependent on the proportions of these constituent materials, ceramic pastes can roughly be classified into those which will be baked at a low temperature for use on sandwich glass sheets, those which will be baked at a medium temperature for use on gravity-bent tempered glass sheets, and those which will be baked at a high temperature for use on press-bent tempered glass sheets. The ceramic collar 12 has a thickness normally ranging from 6 to 30 microns, preferably ranging from 10 to 20 microns.

The silver paste from which the bus bar 14 is formed comprises a mixture of 68 to 88 wt % of silver, 2 to 5 wt % of lead glass having a low melting point, and 10 to 30 wt % of oil, for example. The bus bar 14 has a thickness normally in the range from 4 to 20 microns, preferably in the range from 4 to 10 microns.

To manufacture the bent glass sheet 11, the ceramic paste and the silver paste are successively printed on one surface of an end portion of a flat sheet of glass, and then dried. Thereafter, the glass sheet is placed and heated in a heating furnace up to a softening point, and set in a bending machine. The glass sheet is then bent into a curved shape between bending molds or due to gravity, during which time the ceramic and silver pastes are baked by the heat of the glass sheet.

The temperature T at which the ceramic and silver pastes are baked, i.e., the surface temperature of the glass sheet, is in the range of: $T \leq 100 \log h + 570°$ C. (where h is the thickness (microns) of the baked silver paste) as shown in FIG. 2. The lower limit of such baking temperature is 540° C. when a ceramic paste of a low baking temperature is used, 560° C. when a ceramic paste of a medium baking temperature is used, and 600° C. when a ceramic paste of a high baking temperature is used.

By baking the ceramic and silver pastes in the above baking temperature range, the baked bus bar contains silver at a proportion of 60 wt % or higher.

Figure 2:
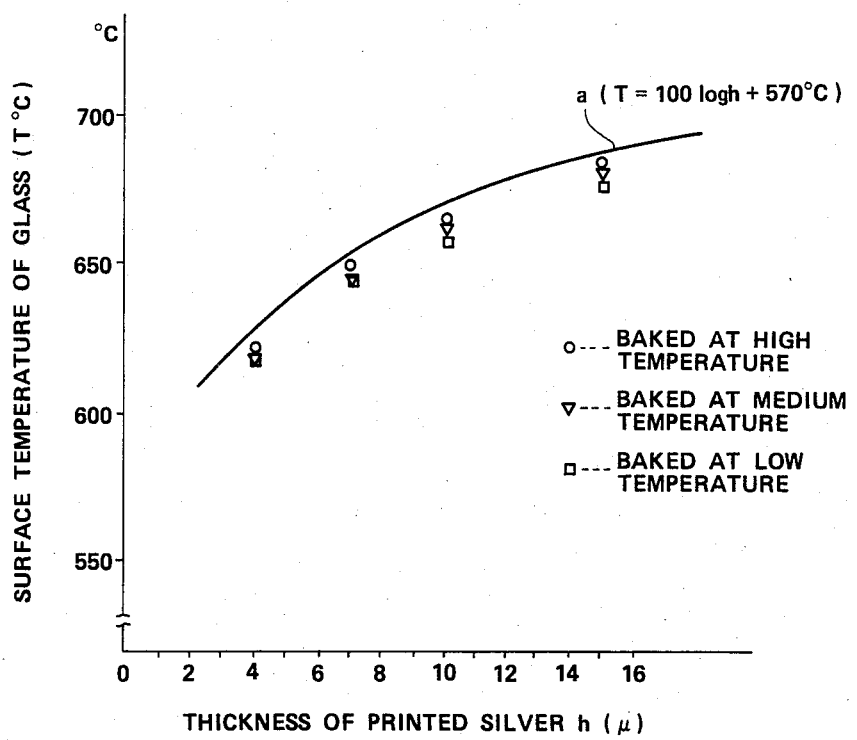
FIG. 2 is a graph showing the relationship between the thickness of a baked silver paste and the baking temperature.
Figure 3:
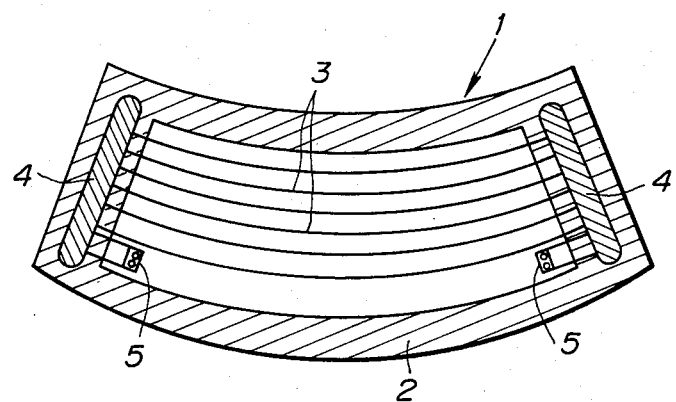
FIG. 3 is a front elevational view of a conventional glass sheet.
Figure 4:
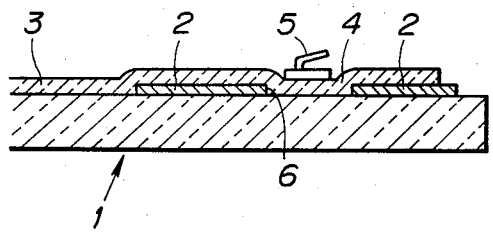
FIG. 4 is a cross-sectional view of an end portion of the conventional glass sheet shown in FIG. 3.

Indicated by the symbols O, ∇, □ in FIG. 2 are points representative of the relationship between the surface temperature T (° C.) of the glass sheet which exhibits a terminal bonding strength of 20 kg f and the thickness h (microns) of the baked silver paste, when silver pastes are baked at a high temperature of about 620° C., a medium temperature of about 580° C., and a low temperature of about 560° C., respectively.

Experimental results obtained when bent glass sheets were manufactured under different conditions are given in the following table:

| Ceramic pastes | Baking temp. (°C.) | Thickness of baked silver paste (microns) | Surface temperature of glass sheet | | | | | | | | | | | |
|---|---|---|---|---|---|---|---|---|---|---|---|---|---|---|
| | | | 570° C. | | | 600° C. | | | 630° C. | | | 660° C. | | |
| | | | | | | Items | | | | | | | | |
| | | | (1) | (2) | (3) | (1) | (2) | (3) | (1) | (2) | (3) | (1) | (2) | (3) |
| Those of low baking temp. | 560 | 15 | O | 90 | 50< | O | 90 | 50< | O | 82 | 50< | O | 63 | 21 |
| | | 10 | O | 88 | 50< | O | 85 | 50< | O | 75 | 35 | O | 55 | ▲ |
| | | 7 | O | 90 | 50< | O | 76 | 35 | O | 61 | 20 | O | 32 | ▲ |
| | | 4 | O | 86 | 50< | O | 65 | 23 | O | 32 | ▲ | O | 24 | ▲ |
| Those of med. baking temp. | 580 | 15 | x | 90 | x | O | 90 | 50< | O | 86 | 50< | O | 61 | 20 |
| | | 10 | x | 90 | x | O | 80 | 48 | O | 72 | 38 | O | 54 | ▲ |
| | | 7 | x | 88 | x | O | 72 | 33 | O | 65 | 23 | O | 30 | ▲ |
| | | 4 | x | 90 | x | O | 62 | 21 | O | 40 | ▲ | O | 25 | ▲ |
| Those of high baking temp. | 620 | 15 | x | 90 | Δ | x | 90 | x | O | 88 | 50< | O | 68 | 32 |
| | | 10 | x | 87 | Δ | x | 88 | x | O | 84 | 50< | O | 65 | 23 |
| | | 7 | x | 91 | Δ | x | 90 | x | O | 72 | 36 | O | 50 | 10 |
| | | 4 | x | 88 | Δ | x | 80 | x | O | 58 | 16 | O | 42 | ▲ |

The items (1) in the above table are indicative of whether the ceramic collars that are 10 to 15 microns thick are well baked or not. The symbol O represents good baking, whereas the symbol X represents poor baking. Whether the ceramic collars are well baked or not was determined by coating the printed surface with oil-base ink and ascertaining if the ink seeps toward the glass surface. The items (2) represent silver proportions (%) in the bus bar after it has been ground, the silver proportions being measured by an X-ray microanalyzer. The items (3) indicate bonding strengths (kg·f) achieved when terminals are attached to bus bar surfaces by solder composed of 64 wt % of Sn and 36 wt % of Pb. The symbol represents bad baking of the ceramic collar, the symbol Δ shows that terminals were detached from bus bars, and the symbol ▲ shows that terminals could not be attached to bus bars.

As is apparent from the above table, the terminal bonding strength is greater as the proportion of silver in the bus bar is higher. For the terminal bonding strength of 20 kg·f which is generally required, the proportion of silver in the bus bar is required to be 60% or higher. The higher the glass shaping temperature, the lower the proportion of silver in the bus bar. The lower the temperature of the ceramic paste and the silver paste, the better these pastes are baked. The greater the thickness of the baked silver paste (bus bar), the higher the proportion of silver contained therein.

With the arrangement of the present invention, a sufficient amount of silver remains in a baked silver paste after ceramic and silver pastes are baked simultaneously with the shaping of a sheet glass. Therefore, a current-supplying terminal can be attached to the bus bar with a high bonding strength. The sheet glass of the present invention is better in design and can easily be manufactured since it has no terminals spaced from a ceramic collar and no recess in the ceramic collar.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:

1. A sheet of glass comprising:
   a surface;
   a baked ceramic paste disposed on said surface; and
   a baked silver paste disposed on said surface over said ceramic paste, said baked silver paste containing silver at a proportion of at least 60 wt %.

2. A sheet of glass according to claim 1, wherein said baked silver paste has a thickness in the range of from 4 to 20 microns.

3. A sheet of glass according to claim 1, wherein said ceramic and silver pastes are baked at a temperature T (° C.) expressed by $T < 100 \log h + 570°$ C. where h is the thickness (microns) of said baked ceramic paste.

* * * * *